Sept. 27, 1960
J. U. WHITE
2,954,510
POWER SUPPLY FOR PHOTOMULTIPLIER
Filed Sept. 18, 1958
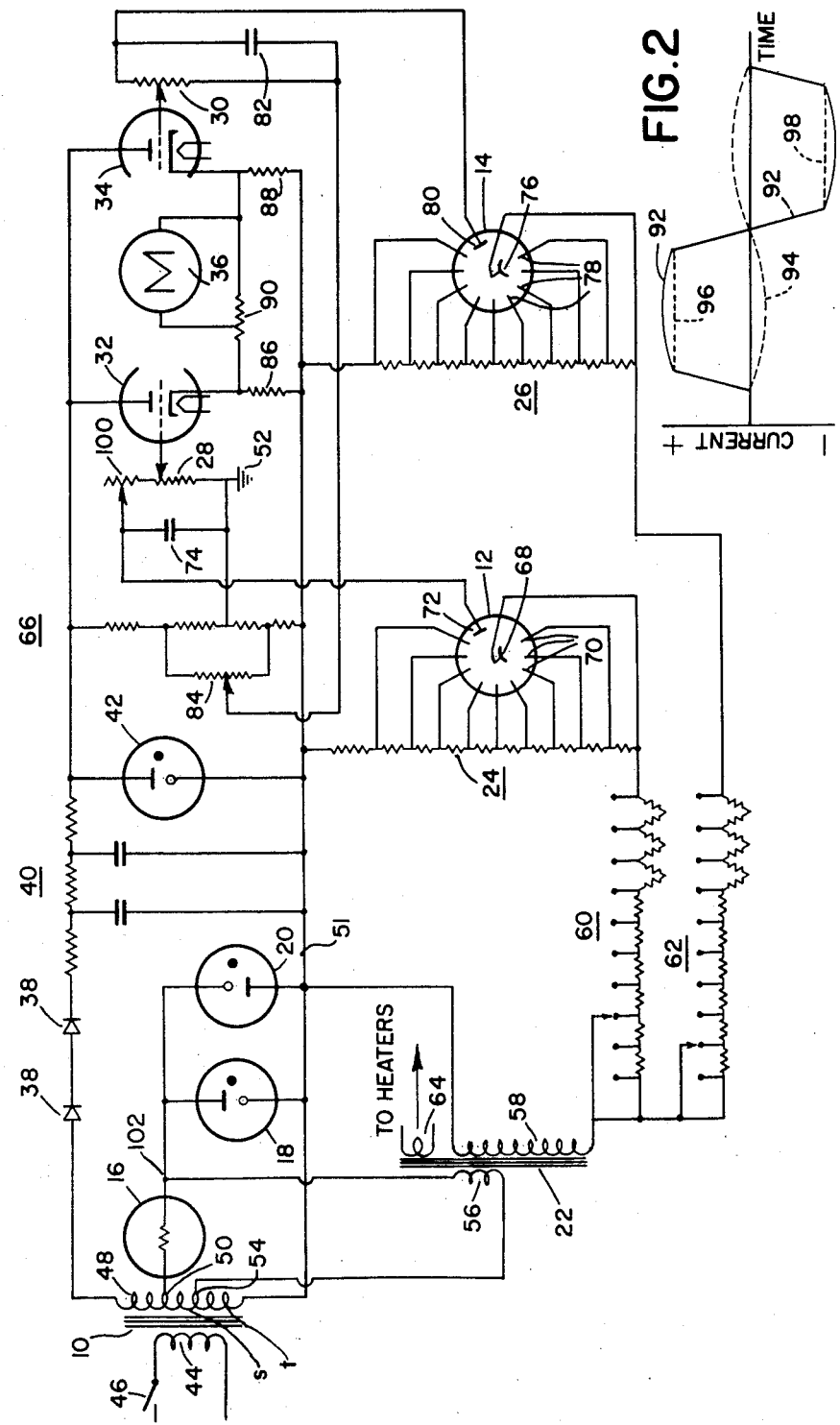

United States Patent Office 2,954,510
Patented Sept. 27, 1960

2,954,510

POWER SUPPLY FOR PHOTOMULTIPLIER

John U. White, Darien, Conn., assignor to Baird-Atomic, Inc., Cambridge, Mass., a corporation of Massachusetts Filed Sept. 18, 1958, Ser. No. 761,842

11 Claims. (Cl. 315—277)

This invention relates to a regulated voltage supply for use with a photo-responsive device operated from an alternating current supply.

Photomultiplier tubes are examples of photo-responsive devices that have certain unusual characteristics which cause them to respond in an unique way to the supply voltages applied to their electrodes. They are particularly sensitive to the supply voltages because they operate by virtue of the emission of secondary electrons from the electrodes, in response to the impact on said electrodes of primary electrons and the number of secondary electrons emitted is affected importantly by the potentials of the electrodes.

The present invention is particularly useful in circuits in which photomultiplier tubes are supplied with alternating voltages.

In one form of the invention, the voltage supplied to the photomultiplier tube is of approximately trapezoidal wave form. The circuit for producing such a voltage comprises a source of sinusoidal alternating voltage, a first path including a limiting device for obtaining a trapezoidal voltage, but distorted so as to have rounded peaks instead of flat peaks, a second path for obtaining a small quantity of alternating voltage in phase with the fundamental component of said trapezoidal voltage, and means for subtracting said small sinusoidal voltage from said distorted trapezoidal voltage so as to obtain an approximately flat-topped trapezoidal voltage. The resulting voltage is applied to the electrodes of a photomultiplier tube. The relative magnitudes of the distorted trapezoidal voltage and the sinusoidal voltage are preferably adjusted until the output from the photomultiplier tube is independent of the line voltage.

Further features and advantages of the invention will appear from the following detailed description of an illustrative embodiment, together with the attached drawings.

Fig. 1 is a schematic circuit diagram illustrating an embodiment of a circuit for a regulated voltage supply specifically adapted for photomultiplier tubes.

Fig. 2 is a wave form useful in explaining the invention.

In Fig. 1, there is shown a power transformer 10 for supplying power to one or more photomultiplier tubes 12, 14. In a secondary circuit of the transformer 10, a ballast resistance tube or lamp 16 is connected in series with a pair of oppositely poled, parallel connected voltage regulator tubes 18 and 20, preferably gas filled discharge tubes. The primary winding of a voltage step-up transformer 22 is connected across the parallel combination of voltage regulator tubes, the primary circuit including a portion of windings of transformer 10 connected in phase opposing relationship to the main power component therein. The secondary winding of the transformer 22 is connected across a voltage dividing network 24 to which the electrodes of the photomultiplier tube 12 are connected. The secondary is also connected across a voltage dividing network 26 for the photomultiplier tube 14. The output from the tube 12 is shown connected to a potentiometer 28 and the output of the tube 14 to a potentiometer 30. By means of cathode follower tubes 32, 34 the output voltages from the potentiometers may be compared in a meter 36 connected to the circuits of both potentiometers, preferably so as to obtain a zero or null reading. Power supply for the cathode followers may be obtained as shown from the power transformer 10 through rectifiers 38, a filter 40, and a voltage regulator tube 42.

Describing the system of Fig. 1 in greater detail, the primary winding 44 of the power transformer 10 is arranged to be connected to a power line, carrying, for example, 60 cycles alternating current at 110 volts, through a switch 46. The secondary winding 48 is shown tapped as at 50 for the connection to the ballast tube 16. The upper end of the winding 48 is connected to the rectifier 38 and the lower end is connected to a return lead or bus 51. The transformer 10 is also shown as having another tap as at 54.

The primary circuit of the step-up transformer 22 includes the portion $t$ of the winding 48 of the power transformer between the tap 54 and the bus 51 in series connection with the primary winding 56 of the step-up transformer. The secondary winding 58 of the step-up transformer is connected at the upper end to the bus 51 and at the lower end to a rheostat 60 serially connected to the voltage divider 24 for the photomultiplier 12. The winding 58 is also connected at its lower end to a rheostat 62 serially connected to the voltage divider 26 for the photomultiplier 14. The end of each voltage divider remote from its associated rheostat is connected to the bus 51. A third winding 64 may be provided in transformer 22 for connection to the heaters of the cathode followers 32 and 34 to provide a regulated heater voltage which contributes to the stability of the null reading in meter 36.

The photomultiplier tube 12 contains a cathode 68, a plurality of dynodes 70 and an anode 72. The cathode is connected to the lower end of the voltage divider 24. The dynodes are connected respectively to intermediate points on the voltage divider 24 and the anode 72 is connected to the ungrounded side of a smoothing capacitance 74, the smoothing capacitance being in parallel with the potentiometer 28 and grounded as at 52. The movable arm of the potentiometer 28 is connected to the control grid of the cathode follower 32.

Similarly, the photomultiplier tube 14 contains a cathode 76, a plurality of dynodes 78 and an anode 80. The cathode 76 is connected to the lower end of the voltage divider 26. The dynodes are connected respectively to intermediate points on the voltage divider 26 and the anode 80 is connected to the upper side of a smoothing capacitance 82 that is in turn in parallel with the potentiometer 30. The movable arm of the potentiometer 30 is connected to the control grid of the cathode follower 34. The lower sides of the capacitance 82 and potentiometer 30 are connected in common to the movable arm of a potentiometer 84 which latter is connected across a portion of the voltage divider 66 extending both above and below ground potential.

The cathode circuits of cathode followers 32 and 34 include respectively cathode resistors 86 and 88. The meter 36, shunted by a potentiometer 90, is connected between the upper ends of the cathode resistors 86, 88.

The anode-cathode path of the cathode follower tube 32 together with the cathode resistor 86 in series with the anode-cathode path forms a circuit connected in parallel across the entire voltage divider 66. Another similar circuit in parallel with the voltage divider 66 is formed by the anode-cathode path of the cathode follower tube 34 in series with the cathode resistor 88.

In the operation of the system of Fig. 1, a principal feature involving the invention is the furnishing of a regulated alternating current supply to one or more photo-multiplier tubes. For this purpose a portion of the voltage developed in the secondary winding 48 is led off at the tap 50 into a circuit branch comprising the ballast tube 16 and the oppositely directed voltage regulator tubes 18 and 20. In the drawing, the reference character $s$ designates that portion of the secondary winding 48 of the transformer 10, between the taps 50 and 54. It will be assumed that the voltage developed in the transformer is substantially sinusoidal in wave form. Due to the presence in the circuit of the voltage regulator tubes, substantially no current flows through the circuit while the voltage in the transformer is passing through zero and until a certain threshold voltage is built up sufficient to cause a voltage regulator tube to fire. During this initial period the voltage induced in the circuit by the transformer is absorbed across the voltage regulator tubes. When firing occurs, the current rises very rapidly, that is, more rapidly than sinusoidally, to a value which is limited by the series resistance of the circuit including the resistance of the ballast tube. The transformer voltage then divides between the ballast tube and the voltage regulator tube in such proportion as is required in order that the voltage across the voltage regulator tube may remain substantially constant. When the transformer voltage falls below a certain value necessary for sustaining the current in the voltage regulator tube, the current falls off suddenly to zero.

It may be seen that in this illustrative circuit the voltage regulator tubes 18 and 20 serve as limiting means.

Fig. 2 shows graphically the type of wave forms that are contemplated. Except for possibly a transient spike which for present purposes may be disregarded, the solid line 92 represents the type of voltage wave produced across the combination of ballast tube and two oppositely poled voltage regulator tubes. In practice it is found that the wave top is bowed slightly upward on the positive half-cycle and slightly downward on the negative half-cycle. The amount of the bowing increases as the line voltage increases.

To correct for the bowing of the type illustrated by curve 92 in Fig. 2, an alternating wave of relatively small amplitude and reversed polarity compared to the main wave is generated as by means of the tap 54 of transformer 10. This reversed polarity wave is shown at 94 in Fig. 2. The main wave 92 and the reversed polarity wave 94 are combined in the serial circuit comprising winding 56 of transformer 22 and the portion $t$ of winding 48 of transformer 10 between tap 54 and bus 51. This portion $t$ may be referred to as a tertiary winding portion of the transformer 48. The resultant wave has flatter tops and flatter bottoms as indicated by the dotted curves 96 and 98 in Fig. 2. It will be understood that the portions of the wave 94 outside the regions of the relatively flat portions of the wave 92 produce merely a slight incidental modification of the steep rising and falling portions of the wave 92.

In effect, residual variations in voltage on the flat-topped portions of the wave due to line voltage fluctuations are compensated with an equal amount of variation in the opposite sense by means of a low voltage wave from tap 54 of power transformer 10. The amount of compensating voltage is preferably selected to make the output of the step-up transformer 22 as invariant as possible to changes in line voltage applied to the power transformer 10. In an embodiment that has been built and successfully tested, the degree of stabilization is such that a photomultiplier tube illuminated by a light source of fixed intensity and operated directly on the output of the transformer 22 shows less than a one percent change in its response to the illumination for a ten percent change in the line voltage.

The presence in the system of a wave of the form illustrated in Fig. 2 with the flattened top and bottom portions as indicated at 96 and 98 in Fig. 2 may be observed by means of an oscilloscope (not shown) suitably coupled to the transformer 22. The transformer 22 serves to step up the voltage of such a wave, the stepped-up wave being obtained in the secondary winding 58 and impressed across the serial combination of rheostat 60 and voltage divider 24 as well as across the serial combination of rheostat 62 and voltage divider 26. By virtue of the voltage step-up in the transformer 22, the voltage impressed upon the electrodes of the photomultiplier tubes may be made sufficient for proper operation of these tubes.

During one half-cycle of the alternating current wave impressed upon the photomultiplier tube by the transformer 22 the lower end of the voltage divider 24 or 26 as viewed in Fig. 1 is made more negative than the upper end. Then the cathode is the most negative electrode and the successive dynodes are given ascending positive biases relatively to the cathode and to one another. The anode, because of its connection to a point of potential determined by an intermediate point on the voltage divider 66, is more positive than the bus 51 and so also more positive than any of the dynodes. So, during this half-cycle, conditions are suitable for proper operation of the photomultiplier tube. The tube in this condition responds in substantially linear manner to illumination of its cathode within suitable operating limits.

During the next succeeding half-cycle, all the voltages are reversed and the photomultiplier tube is inoperative. While this means that the operation of the photomultiplier tubes in the system of Fig. 1 is intermittent at the frequency of the power supply to the transformer 10, for example 60 cycles per second, such intermittent operation is entirely satisfactory for most practical purposes, and has the important advantage that the necessary voltage step-up is more economically obtained by means of the step-up transformer than would be feasible in a direct current supply system. From another viewpoint, it is advantageous to supply the alternating wave directly to the photomultiplier tube rather than to rectify and filter this wave before applying it to the tube. In the latter procedure undesirable harmonic frequencies might be introduced. The smoothing capacitances 74 and 82 used in the output circuits of the photomultiplier tubes tend to compensate for the intermittent nature of the operation brought about by the alternating current supply.

The advantage of a flat-topped energizing wave over a sinusoidal supply wave of the same maximum voltage will be evident because the sinusoidal wave attains and maintains full voltage over only a small portion of the cycle whereas the flat-topped wave has a relatively longer period of substantially full voltage.

In the system of Fig. 1, under illumination, the anode 72 of photomultiplier tube 12 supplies an intermittent current to the smoothing capacitance 74 and the anode 80 of photomultiplier tube 14 supplies an intermittent current to the smoothing capacitance 82. The voltage across the associated smoothing capacitance will be a function of the intensity of the illumination. As the amount of the capacitance may be made large, the voltage across the capacitance will be substantially constant when the illumination is constant.

To compare different illuminations incident upon the two tubes, the potentiometers 28 and 30 may be adjusted so as to obtain a null reading in the meter 36. The ratio of the intensities of the illuminations may then be deduced from readings of the settings of the potentiometers.

While satisfactory compensation for many purposes will be obtainable simply by employing the compensating arrangement above described, in a system as in Fig. 1 where two photo-sensitive devices have their outputs opposed to each other in a balanced type circuit still more effective compensation results. As both multiplier tubes are operated from the same voltage supply, any uncompensated residual variations in line voltage affect the two tubes about the same, and the ratio of their outputs is affected even less.

Another feature of the system disclosed herein is that it employs no high voltage condenser, and the amount of current it can deliver is limited by the resistance in the primary winding 58 to quite safe, low values.

The rheostats 60 and 62 provide separate high voltage adjustments for matching the sensitivities of different multiplier tubes.

In the embodiment above referred to, the electrical zero or null reading is stable within two millivolts over long periods of time. The resistance of one smoothing network may be made adjustable as by use of a rheostat 100 as shown connected in series with potentiometer 28, whereby the time constants of the respective networks 74, 28 and 82, 30 may be made equal. The potentiometer 84 may be used to adjust to zero the initial reading of the meter 36, while the meter shunt 90 may be used to set the sensitivity of the meter 36 so as to make use of full scale deflection of the meter.

Anode potentials and cathode biasing potentials for operating the cathode follower tubes are obtained from the voltage divider 66 which is in turn supplied with rectified current by means of the secondary winding 48 of power transformer 10, the rectifiers 38, and filter 40. The voltage across the voltage divider 66 is regulated by the voltage regulator tube 42. The operation of this portion of the system is conventional.

From the above description it will be understood that the circuit of Fig. 1 may be regarded as including circuit means forming a first path (comprising the voltage regulator tubes 18 and 20, along with the ballast resistance tube 16 and the winding s), circuit means forming a second path (including the winding portion t), and output means (including the windings 56 and 58 of the transformer 22). The winding 56 is connected to the circuit means in the first path (as at the junction point 102) and to the circuit means in the second path (as at 54) for subtracting the voltage in the second path from the voltage in the first path. The output voltage from the transformer 58 is applied to the rheostats 60 and 62 and the network 24, and thereby to the photo-responsive devices 12, 14. In one way of viewing the circuit, the winding portion t (along with the winding 56 in series with it) is connected in parallel with the voltage regulator tubes.

While the invention has been illustrated as applied to a photomultiplier tube, it is to be understood that the invention is not, in its broadest aspect, limited to use with such a tube, but may be used with other photo-responsive tubes or devices which require a highly regulated power supply.

It will be understood that where tapped transformer winding portions are shown, separate windings suitably connected into the circuit to give the desired polarities may be substituted, or tapped windings may replace separate windings.

While an illustrative form of apparatus and a method in accordance with the invention have been described and shown herein, it will be understood that numerous changes may be made without departing from the general principles and scope of the invention.

What is claimed is:

1. In a regulated voltage supply specifically adapted for application to photo-responsive devices, in combination, circuit means forming a first path, circuit means forming a second path and connected in parallel with at least a portion of said first circuit means, means applying an approximately sinusoidal alternating line voltage to each of said circuit means, means in said first path including limiting means for producing, in response to said sinusoidal voltage a distorted trapezoidal voltage having rounded positive and negative peaks, output means connected to said circuit means in said first path and to said circuit means in said second path for subtracting said voltage in said second path from said voltage in said first path, means for applying the resulting output voltage to said photo-responsive device, and circuit means for causing the amount of said voltage in said second path subtracted from said voltage in said first path to be of such magnitude that the response of said photo-responsive device is substantially independent of said line voltage.

2. Apparatus according to claim 1, in which the said limiting means comprises a gas filled discharge tube.

3. Apparatus according to claim 1, in which the said limiting means comprises two gas filled unidirectionally conductive discharge tubes oppositely poled to transmit an alternating current.

4. Apparatus according to claim 1, in which said output means comprises a step-up transformer.

5. In a regulated voltage supply specifically adapted for supplying power to a photo-responsive device from a source of substantially sinusoidal alternating current, in combination, a first path including in serial connection a first transformer winding portion, ballast resistance means, and voltage regulating means, a second path including in serial connection a second transformer winding portion coupled to said first winding portion and a third transformer winding coupled to said photo-responsive device, said second path being connected in parallel connection across said voltage regulating means, and a primary winding of a power transformer connected to said source of substantially sinusoidal alternating current, said primary winding being coupled to said first and second transformer winding portions in such phase relationship in said two winding portions as to oppose their effects with respect to said third transformer winding, whereby the wave form developed across said voltage regulating means is modified by an opposed sinusoidal wave developed in said second winding portion.

6. Apparatus according to claim 5, in which the said voltage regulating means is a gas filled discharge tube.

7. In a regulated voltage supply specifically adapted for supplying power to a photo-responsive device from a source of substantially sinusoidal alternating current, in combination, a power transformer having primary, secondary and tertiary winding portions, a voltage step-up transformer having a primary winding and a secondary winding, a secondary circuit for said power transformer comprising a ballast resistor serially connected to a parallel combination of oppositely poled voltage regulator tubes, a circuit connected in parallel across said voltage regulator tubes and comprising the tertiary winding portion of the power transformer in series with the primary winding of the said step-up transformer, said tertiary winding portion being so poled that the resultant wave induced in the secondary winding of said step-up transformer as a result of a voltage wave developed in said tertiary winding portion is substantially opposite in phase to the resultant wave induced in the secondary winding of the said step-up transformer as a result of a voltage wave developed in the secondary winding portion of the power transformer.

8. Apparatus according to claim 7, in which the said voltage regulator tubes are gas filled discharge tubes.

9. In a regulated voltage supply specifically adapted for supplying power to a photo-responsive device from a source of substantially sinusoidal alternating current, in combination, first and second circuit means connected to said source for producing waves of two substantially opposite phases in the respective circuit means, means connected to said first circuit means for producing from one of said phases an approximation to a trapezoidal wave with distortion in the form of departure from flatness in the generally horizontal portions of the wave, means including a step-up transformer for combining the other said phase with said distorted trapezoidal wave, means to impress the resultant wave upon said photo-responsive device, and circuit means for causing the relative amplitudes of waves so combined to be of such value that the response of said photo-responsive device is substantially independent of said line voltage.

10. In a voltage supply for a photo-responsive device, in combination, voltage regulator means for converting a substantially sinusoidal wave into an approximately trapezoidal wave in which the nominally flat portions of the wave are rounded, the degree of rounding increasing with the amplitude of the sinusoidal wave, an output transformer having a primary winding and a secondary winding, means for providing a compensating sinusoidal wave, a subtracting network including the primary winding of said output transformer and connections from it to said last-mentioned means and to said voltage regulator means, means to combine a compensating wave with said trapezoidal wave to reduce the rounding of the said nominally flat portions of the trapezoidal wave, and means to control the amplitude of the said compensating wave to follow variations in the amplitude of the first-mentioned sinusoidal wave, whereby the said rounding is substantially eliminated over an extended range of amplitudes of the said first-mentioned sinusoidal wave.

11. In a regulated voltage supply for producing an approximately trapezoidal output voltage in combination, a power transformer having a primary winding portion, a secondary winding portion, and a tertiary winding portion, circuit means forming a first branch including voltage regulator means connected to receive voltage from said secondary winding portion, an output transformer having a primary winding and a secondary winding, said primary winding of said output transformer and said tertiary winding portion of said power transformer being connected in series with one another, and in parallel with said voltage regulator means, means including said primary winding portion of said power transformer applying approximately sinusoidal alternating line voltage to said secondary winding portion and to said tertiary winding portion, said voltage regulator means producing, in response to said sinusoidal voltage, a distorted trapezoidal output voltage having rounded positive and negative peaks, said primary winding of said output transformer being so connected to said tertiary winding portion of said power transformer and to said voltage regulator means as to subtract a quantity of the voltage in said tertiary winding portion from the said distorted trapezoidal voltage, to modify the output voltage wave shape appearing in the secondary winding of said output transformer.

References Cited in the file of this patent

UNITED STATES PATENTS

| | | |
|---|---|---|
| 2,430,265 | Weisglass | Nov. 4, 1947 |
| 2,590,827 | Stamm et al. | Mar. 25, 1952 |
| 2,647,436 | Shapiro | Aug. 4, 1953 |
| 2,684,448 | Nilles | July 20, 1954 |
| 2,807,723 | Singer et al. | Sept. 24, 1957 |
| 2,827,575 | Smith et al. | Mar. 18, 1958 |